Sept. 16, 1969     M. M. BROWN     3,466,709

MOLDING FASTENER

Filed June 21, 1967     2 Sheets-Sheet 1

INVENTOR.
MARTIN M. BROWN.
BY
WILSON, SETTLE & BATCHELDER.
ATT'YS.

Sept. 16, 1969  M. M. BROWN  3,466,709
MOLDING FASTENER
Filed June 21, 1967  2 Sheets-Sheet 2

INVENTOR.
MARTIN M. BROWN.
BY
WILSON, SETTLE & BATCHELDER.
ATT'YS.

United States Patent Office 3,466,709
Patented Sept. 16, 1969

3,466,709
MOLDING FASTENER
Martin M. Brown, Birmingham, Mich., assignor to Robin Products Company, Warren, Mich., a corporation of Michigan
Filed June 21, 1967, Ser. No. 647,749
Int. Cl. B60r 13/00
U.S. Cl. 24—73                                     8 Claims

ABSTRACT OF THE DISCLOSURE

A method and apparatus for securing trim to an automobile body panel. The apparatus includes a fastener assembly having a socket attached to an impervious portion of the body panel to provide an opening spaced from the surface of the panel and a clip or adapter telescoped over the socket and secured to the socket with means on the clip for receiving the trim.

BACKGROUND OF THE INVENTION

The present invention relates generally to the finishing of the exterior surfaces of an automobile body panel and more particularly to a method of and apparatus for securing decorative trim or other objects to a surface of an automobile body panel.

Until recent years, it has been customary in securing decorative trim to automobile body panels to punch a plurality of holes in an automobile body panel, such as a fender, followed by the anchoring of fasteners in the holes. Thereafter, the decorative trim was secured to the fasteners. However, since the sheet metal used to form the panel is around the dimensional range of 0.035 inch to 0.040 inch, the thin edge walls of the holes in the panel did not satisfactorily draw and retain a coating of the finished material used in finishing the automobile body panel which would result in corrosion beginning at the walls of the holes.

In an effort to overcome the corrosion problem alluded to above, a recent development has been exploited in which a button on the order of 0.120 to 0.160 inch high was welded to the automobile body panel and a very specially designed adapter was secured to the button with the adapter having attaching means for receiving the decorative trim to thereby secure the trim to the automobile body panel without the necessity of providing the hole on the body panel. This developement is set forth in the Meyers Patent No. 3,239,988 and alleviated the corrosion problem produced by the holes punched into the body panel.

However, this manner of attaching decorative trim to an automobile body panel, while eliminating one problem, produced several more serious problems. Some of these problems can be summarized as follows:

(1) The small contact area between the buttons and the surface of the body panel resulted in the buttons being easily broken away from the body panel if a nonaxial force were applied to the buttons;

(2) The small contact area between the body panel surface and the buttons oft times resulted in a hole being developed in the body panel due to the heat produced in this small contact area during the welding of the button to the body panel;

(3) Using a button of the type disclosed in the Meyers patent, required a very complicated adapter having ramps and slots which would be capable of securely locking the adapter to the button; and (4) Keeping the button perpendicular to the surface of the panel for proper placement and alignment of the trim.

(5) In adapting the process for automation difficulties were encountered in feeding the very small peculiarly shaped buttons to have them readily available, when desired.

SUMMARY OF THE INVENTION

The present inveniton alleviates all of the problems set forth hereinabove while at the same time utilizes the advantages in securing a decorative trim strip to an automobile body panel without the need of providing holes in the body panel. The present invention utilizes the proven method of interconnecting two parts, i.e., a hole and locking means received in the hole, while still eliminating the need for perforating a support panel to which a trim strip is to be secured. Both fastener parts are very simple in construction and are readily capable of being fed automatically to a machine. Furthermore, the contact area between the fastener part and the automobile body panel as well as the contact area between the fastener parts is considerably larger than the contact area for the buttons utilized in the Meyers process while, at the same time, both parts are of very simple construction to thereby be manufactured at a very small cost.

Generally speaking, a socket is secured to an impervious unfinished surface of an automobile body panel, as by welding, to define an opening spaced from the panel surface. Thereafter, all of the necessary steps for producing a final finish on the surface of the body panel can readily be performed without any interference from the socket or sockets secured to the body panel. After the body panel has been completely finished, clips are telescoped over each of the sockets and are locked thereto by locking means received by the socket openings. Of course, the clips have retaining means thereon for removably receiving the decorative trim or molding.

Thus, the primary object of the present invention is to provide an improved method for removably securing an object to a support structure by providing an opening spaced from the surface of the support structure.

Another object is to provide a fastener assembly for attaching an object to a support structure which includes a socket secured to the support structure that defines an opening spaced from the surface of the structure and a second part telescoped over the socket with locking means received in the socket opening.

These and other objects and features of this invention will become more fully apparent from the appended claims as the ensuing detailed description precedes in conjunction with the accompanying drawings in which:

IN THE SPECIFICATION

Before explaining the present invention in detail, it is to be understood the invention is not limited in its application to the details of construction and arrangement of parts illustrated in the accompanying drawings since the invention is capable of other embodiments and of being practiced or carried out in various ways. Also, it is to be understood that the phraseology and terminology employed herein is for purpose of description and not of limitation.

Figure 1:
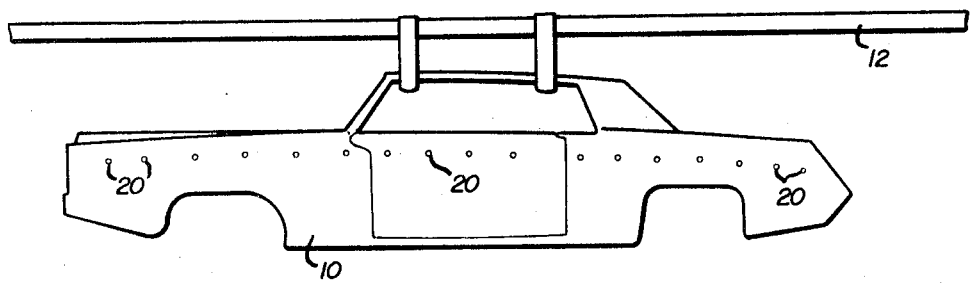
FIGURE 1 is a side elevation of a conventional automobile body supported for movement through successive finishing stations.

FIGURE 1 of the drawings shows a conventional automobile body panel, generally indicated at 10, supported on a conveyor mechanism 12 to be moved along as assembly line for performing a number of different steps of finishing the body panel and securing decorative tirm thereto. According to the invention, the automobile body panel has a plurality of sockets 20 secured thereto which form the first part of the fastener assembly of the present invention.

Figure 2:
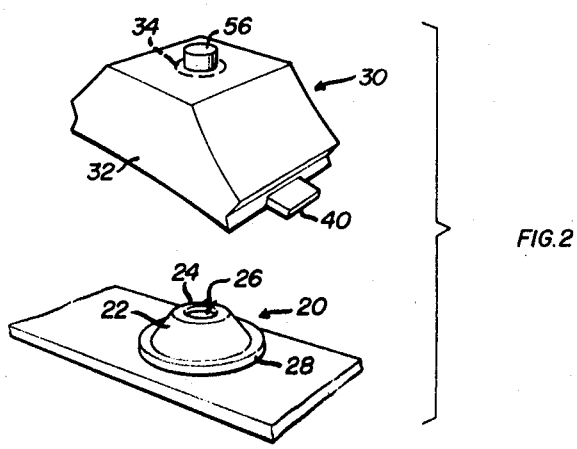
FIGURE 2 is an enlarged perspective view of the fastener assembly of the invention.

A single socket 20 is shown in detail in the perspective view of FIGURE 2 and is preferably formed of a noncorrosive metallic material, such as stainless steel. In the embodiment shown in FIGURES 2 through 4, the socket 20 includes a hollow body portion 22 terminating at the upper end in a substantially horizontal inwardly directed flange 24 which defines an opening 26. The socket or adapter 20 has an enlarged portion or outwardly directed flange 28 at the opposite end thereof which is secured to an impervious portion of the automobile body panel. As clearly shown in FIGURE 2, the body portion 22 is dome-shaped or a conical section defined by a wall of substantially uniform cross section.

The second part 30 of the fastener is likewise shown in the perspective view FIGURE 2. The second fastener part or clip 30 includes a body oprtion 32 having an opening 34 substantially corresponding to the size of the opening 26 in the socket 20. The opening 34 communicates with a recess 36 in the bottom surface of the body portion which is of a size sufficient to accept the body portion 22 of the socket 20. The recess 36 has a groove 38 formed adjacent the lower edge thereof which is adapted to receive the outwardly directed flange 28 of the socket in the assembled condition of the fastener.

The body 32 also includes a pair of outwardly directed fins 40 extending from opposite edges of the clip intermediate the ends of the body 32. The body 32 also includes camming surfaces 42 intersecting with undercut surface 44 which defines grooves or attaching means 46 adjacent the lower edges of the body portion.

The clip or adapter 30 also has locking or securing means for attaching it to the socket 20. In the illustrated embodiment, the opening 34 communicating with the recess 36 has a cylindrical portion 50 integral with the walls of the opening 34 and depending downwardly therefrom into the recess 36. The cylindrical portion 50 is slotted at 52 adjacent the lower end thereof and also has enlarged portions 54 which may be termed enlarged portions or ears extending from the opening 34. The enlarged portions 54 define locking portions, as will be subsequently described, which are adapted to be forced outwardly from the position shown in FIGURE 3 by a drive pin 56.

In finishing the automobile body panel and securing decorative trim thereto, the body panel is moved through finishing stations by the conveyor 12 with successive operations performed at each of the finishing stations. Thus, at the first station, the sockets or primary securing elements 20 of the fastener assembly are secured as by welding, to the unfinished surface of the body panel at predetermined points which are determined by the final position of the decorative trim on the body panel. If desired, this line may be impressed on the body panel surface at a previous station so that the sockets may be accurately aligned.

It should be noted at this point that the outwardly directed flange 28 and the dome-shaped body of the socket fastener will render the edge to be welded readily accessible for this operation. Also, since the height of the socket is on the order of 0.125 inch, the subsequent finishing steps or operations may readily be performed without any interference of the socket to these finishing steps. Likewise, the particular configuration of the socket provides an obtuse angle between the body panel surface and the socket surface so that the entire area is more readily accessible for finishing after the sockets have been secured to the body panel.

After the various sanding and buffing steps have been completed, a continuous film of paint or the like is applied to the body panel surface having the sockets secured thereto. This film of paint will seal the automobile body panel surface, the peripheral joint between the body surface and the socket, as well as the socket itself. Thus, the entire outer or exposed surface of the automobile body panel will be provided with a continuous seal which will prevent any corrosion or rust. Since the socket 20 is preferably formed of a noncorrosive material, the fact that the wall defining the opening 26 in the socket may not receive the same amount of paint will be of no major consequence since this wall or edge will not rust or corrode do to the nature of the material from which it is made.

After all of the finishing, painting and buffing steps have been performed, the finished body panel may be moved to a subsequent station where the clips or adapters 30 are secured to the respective sockets 20. Preferably the longitudinal axis of the clip 30 is aligned with the line formed by the plurality of sockets on the body panel so that the longitudinally disposed grooves or attaching means 46 are located on opposite sides of the line. After each clip or secondary securing element 30 has been properly located on a respective socket or primary securing element 20, the drive pin 56 is forced inwardly so as to force the enlarged portions 54 of the ears outwardly beyound the edge of the opening 26 in the socket 20. Since the height of the recess 36 is slightly greater than the height of the socket 20 and the lower surface of the clip 30 is concave, forcing the drive pin 56 to the position shown in FIGURE 4 will also draw the entire clip downwardly to thus tension the entire clip in the assembled position shown in FIGURE 4.

After all of the clips have been properly located and locked on the respective sockets, the decorative trim 62, which is of concavo-convex cross-section, can readily be forced onto the respective clips and be locked thereto by the cooperating means defined by the grooves 46 and the free ends of the decorative trim 62. It should be noted that the camming surfaces 42 on the clips 30 will guide the free ends of the decorative trim strip down towards the attaching means 46.

Figure 3:
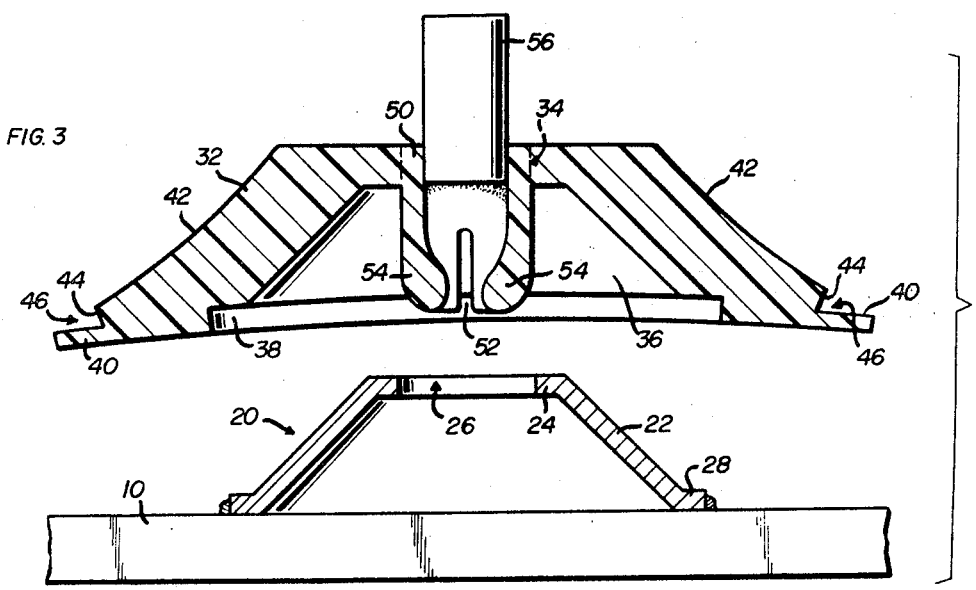
FIGURE 3 is a vertical section of the fastener assembly shown in FIGURE 2.
Figure 4:
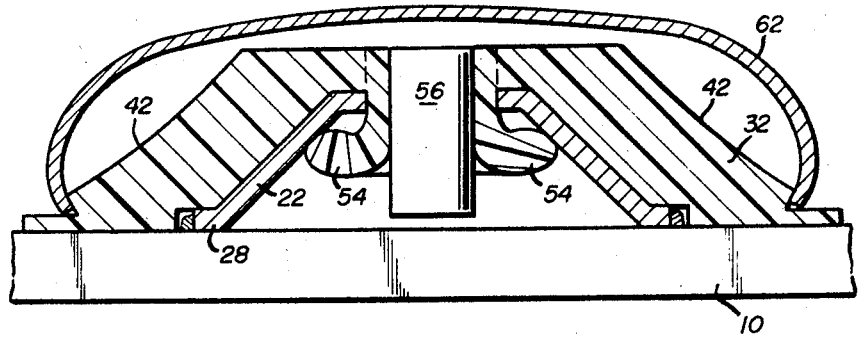
FIGURE 4 is a vertical sectional view of the fastener assembly in the installed position on the automobile body panels.
Figure 5:
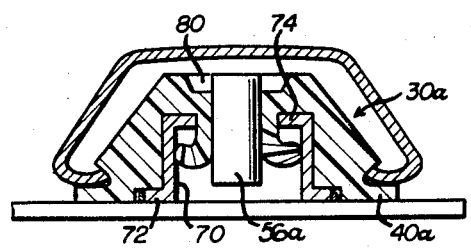
FIGURE 5 is a slightly modified embodiment of the fastener assembly shown in FIGURE 4.

A slightly modified form of socket and clip are shown in FIGURE 5 and are substantially identical in function and operation as the socket and clip shown in FIGURES 2 through 4. Thus, the socket includes a cylindrical portion 70 having an outwardly directed flange or enlarged portion 72 at the lower end thereof and an inwardly directed flange 74 at the upper end thereof defining an opening equivalent to the opening 26.

The slightly modified clip 30a for the modified socket of FIGURE 5 is substantially identical to the clip 30 shown in FIGURE 2. The modified clip 30a further includes a groove or slot 80 partially or completely surrounding the drive pin 56a so as to expose at least a part of the upper end of the drive pin 56a when the fastener assembly is in the assembled position shown in FIGURE 5. The groove or slot 80 will expose at least a portion of the upper end of the drive pin 56a so that the drive pin may be removed and thereafter the clip may readily be removed from the socket, if desired.

Figure 6:
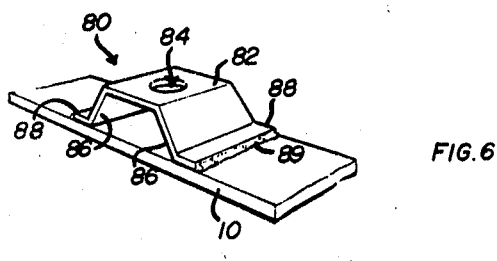
FIGURE 6 is a perspective view of a further modified fastener part.

A further modification of the socket 20 of FIGURE 2 is shown in FIGURE 6. The elongated socket 80 of FIGURE 6 includes an upper portion 82 spaced from the surface of the body panel 10 with an opening 84 in the center of the upper portion. The upper portion 82 has a pair of integral angularly related legs 86 depending from opposite edges terminating at the lower ends with enlarged portions or outwardly directed flanges 88 that engage and are attached to the body surface, as by welding 89. The clips (not shown) to be telescoped over the sockets 80 would be identical to the clips 30 or 30a except that the recess 36 would extend the entire length of the body portion 32 for receiving the elongated socket 80.

The modified socked shown in FIGURE 6 is of particular advantage in finishing the body panel after the sockets have been secured thereto. Thus, the elongated opening between the upper portion 82 and the body panel surface leaves the body panel surface between the ends of the socket substantially completely exposed for receiving a film of paint during painting. Of course, if desired, the flanges 88 could be segmented with recesses between the segments to reduce the amount of welding required as well as provide drain holes intermediate the ends of each socket.

As readily can be appreciated, the fastener assembly provides a means for securing decorative trim to an automobile body panel without the necessity of punching holes into the panel and at the same time utilizes the proven manner of interconnecting a pair of parts.

While several embodiments have been shown and described, it is readily apparent that various modifications and changes may be made without departing from the scope of the invention. Thus, by way of example and not of limitation, various types of securing means could be substituted for the securing means between the clip and the socket shown in the illustrated embodiments. For example, the opening 26 could be elongated and the upper surface of the recess in the clip could carry an oval shaped downwardly depending integral projection having an undercut portion adjacent the upper surface of the recess so that rotation of the clip 90° would locate the major axes of the elongated slot and the oval portion perpendicular to each other to lock the clip to the socket. Thus, the embodiments shown and described are to be considered as exemplary only and various modifications may be resorted to without departing from the spirit of the invention as defined by the following claims.

I claim:
1. In a device for securing a hollow member to an impervious support structure, comprising a hollow fastener part having one end secured to said support structure and means on the opposite end defining an opening spaced from said support structure, a clip having a recess receiving said fastener part and an opening communicating with said recess, said clip being axially inserted on said fastener part with the opening of the clip overlying the opening of the fastener part and locking means in said openings for locking said clip to said hollow fastener part.

2. A device as defined in claim 1, in which said clip has an elongated body portion axially aligned with said hollow member, fins extending outwardly on opposite sides of said body portion, said body portion having means defining longitudinal grooves which receive free ends of said hollow member with the fins being disposed between the free ends of said hollow member and said support.

3. A device as defined in claim 1, in which said locking means includes a plurality of resilient ears integral with the walls of the opening in said clip and extending into said recess of the clip, said ears being received through the opening in said hollow fastener part with each of said ears having an enlarged portion at the free end thereof, and means for flexing said enlarged portions away from the axis of the opening in said clip whereby to lock said clip to said support structure.

4. A device as defined in claim 3, in which said hollow fastener part is substantially circular in cross-section and the peripheral surface is tapered to thereby define an enlarged portion engaging said support structure.

5. A device as defined in claim 1, in which said fastener part comprises a dome-shaped member with said means on said opposite end comprising an inturned flange, said dome-shaped member including an enlarged portion on said one end secured to said support structure.

6. In a mounting for an object to be secured to a supporting part, attaching means comprising, a noncorrosive tubular member having one end secured to an impervious portion of said supporting part, means adjacent the opposite end of said tubular member defining a member opening, a nonmetallic clip axially received on said hollow member to substantially enclose said member and having spaced portions frictionally engaging said supporting part and securing means received through said member opening attaching said clip to said member.

7. A mounting as defined in claim 6, in which said member is dome-shaped with an enlarged portion at said one end attached to said support.

8. A device as defined in claim 6, in which said means adjacent said opposite end comprises an inturned flange defining said opening.

References Cited

UNITED STATES PATENTS

| 1,266,547 | 5/1918 | Baxter | 52—718 |
| 3,246,440 | 5/1966 | Meyer | 52—718 |

FOREIGN PATENTS 1,350,859   12/1963   France.

JOHN E. MURTAGH, Primary Examiner

U.S. Cl. X.R.

52—718